US010687306B2

(12) United States Patent
Raman et al.

(10) Patent No.: US 10,687,306 B2
(45) Date of Patent: Jun. 16, 2020

(54) INTELLIGENT THROTTLING AND NOTIFICATIONS MANAGEMENT FOR MONITORING AND INCIDENT MANAGEMENT SYSTEMS

(71) Applicant: Microsoft Technology Licensing, LLC, Redmond, WA (US)

(72) Inventors: Vidyasankar Raman, Redmond, WA (US); Derek Menzies, Redmond, WA (US); Congjie Mi, Bellevue, WA (US); Duke Kamstra, North Bend, WA (US); Shripad Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 15/875,832

(22) Filed: Jan. 19, 2018

(65) Prior Publication Data

US 2018/0288736 A1 Oct. 4, 2018

Related U.S. Application Data

(60) Provisional application No. 62/479,638, filed on Mar. 31, 2017.

(51) Int. Cl.
*H04W 68/02* (2009.01)
*H04L 29/08* (2006.01)
(Continued)

(52) U.S. Cl.
CPC .......... *H04W 68/02* (2013.01); *H04L 43/04* (2013.01); *H04L 43/0817* (2013.01);
(Continued)

(58) Field of Classification Search
CPC .... H04W 68/02; H04W 68/005; H04L 43/16; H04L 43/0876; H04L 43/0817; H04L 67/26; H04L 43/04
See application file for complete search history.

(56) References Cited

U.S. PATENT DOCUMENTS 8,751,500 B2 6/2014 Duarte et al.
9,110,740 B1 8/2015 Djabarov et al.
(Continued)

FOREIGN PATENT DOCUMENTS

WO 2017112331 A1 6/2017

OTHER PUBLICATIONS

"Specifying Throttles for Events, Subscriptions, and Notifications", Retrieved From <<https://technet.microsoft.com/en-us/library/ms171354(v=sql.90).aspx>>, Retrieved on: Sep. 22, 2017, 2 Pages.
(Continued)

*Primary Examiner* — Kiet Tang
(74) *Attorney, Agent, or Firm* — Fiala & Weaver P.L.L.C.

(57) ABSTRACT

Methods, systems, and apparatuses are described for throttling and management of notifications. A rules manager stores definitions of multiple classes of notifications for sending to recipients. Each of the classes has a respective set of throttling parameters that enables notifications in each class to be selectively throttled. A notification monitor monitors the number of notifications in each class transmitted to a plurality of recipients over time. In response to determining that a threshold number of notifications of a class have been transmitted to a recipient during an interval of time, the recipient is placed in a throttled mode for the class that reduces a subsequent number of notifications transmitted to the recipient. The threshold number may be dependent upon a transmission channel of the notification. The recipient is informed of being placed in the throttled mode and provided an indication of where subsequent notifications can be accessed.

20 Claims, 10 Drawing Sheets

(51) Int. Cl.
    *G06F 11/30*       (2006.01)
    *H04L 12/58*       (2006.01)
    *H04L 12/26*       (2006.01)
    *H04W 68/00*     (2009.01)

(52) U.S. Cl.
    CPC .......... *H04L 43/0876* (2013.01); *H04L 43/16* (2013.01); *H04L 67/26* (2013.01); *H04W 68/005* (2013.01)

(56) References Cited

U.S. PATENT DOCUMENTS

| | | |
|---|---|---|
| 9,633,203 B2 | 4/2017 | Sanjeev et al. |
| 2008/0098071 A1* | 4/2008 | Jones .................. G06Q 10/107 709/206 |
| 2009/0249481 A1* | 10/2009 | Long ...................... H04L 51/12 726/22 |
| 2010/0102982 A1* | 4/2010 | Hoveida ............ G06F 11/3072 340/691.3 |
| 2011/0060996 A1 | 3/2011 | Alberth, Jr. et al. |
| 2012/0079024 A1 | 3/2012 | Tse et al. |
| 2012/0331047 A1* | 12/2012 | Sana ...................... H04L 67/26 709/203 |
| 2015/0098336 A1 | 4/2015 | Pasini et al. |
| 2016/0364467 A1 | 12/2016 | Gupta et al. |
| 2017/0302609 A1* | 10/2017 | Vardhan ................. H04L 51/24 |

OTHER PUBLICATIONS

"vFabric Hyperic Administration", Retrieved From <<https://www.vmware.com/pdf/vFabric-Hyperic-Administration-57.pdf>>, Jun. 2013, 134 Pages.

\* cited by examiner

INTELLIGENT THROTTLING AND NOTIFICATIONS MANAGEMENT FOR MONITORING AND INCIDENT MANAGEMENT SYSTEMS

CROSS-REFERENCE TO RELATED APPLICATIONS

This application claims priority to U.S. Provisional Patent Application No. 62/479,638, filed Mar. 31, 2017 and entitled "Intelligent Throttling And Notifications Management For Monitoring And Incident Management Systems," the entirety of which is incorporated by reference herein.

BACKGROUND

Running a cloud service requires a robust monitoring system with appropriate monitors generating notifications such as alerts to notify engineers and/or customers of any service issues that may arise. Typically, this is done using suitable systems that can deliver notifications via messaging services such as the short message service (SMS), telephone calls, electronic mail (email), push notifications, etc.

When a problem does occur with a system being monitored, it often causes several monitors to fire resulting in multiple monitoring notifications being sent out. This often leads to a flood of notifications, sometimes in the hundreds or thousands, that overwhelm the user. For example, an engineer may have to acknowledge dozens and sometimes hundreds of notifications, thereby causing important information to be hidden and/or lost in the barrage of notifications.

The deluge of messages is not limited to alerts and notifications sent to service engineers, but also occurs with notifications sent to customers regarding system outages. For example, when a cloud computing service is experiencing an outage, it is desirable to notify users as quickly as possible, and then provide ongoing updates regarding resolution of the issue. However, these notifications are delivered alongside any monitoring alerts and other notifications being provided to the user, increasing the overall volume of notifications.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for throttling and management of notifications. A rules manager stores definitions of multiple classes of notifications for sending to recipients. Each of the classes has a respective set of throttling parameters that enables notifications in each class to be selectively throttled. The notification monitor monitors the number of notifications in each class transmitted to a plurality of recipients over time. In response to determining that a threshold number of notifications of a class has been transmitted to a recipient during an interval of time, the recipient is placed in a throttled mode for the class that reduces a subsequent number of notifications transmitted to the recipient. The threshold number may be dependent upon a transmission channel of the notification. The recipient is informed of being placed in the throttled mode and provided an indication of where subsequent notifications can be accessed.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
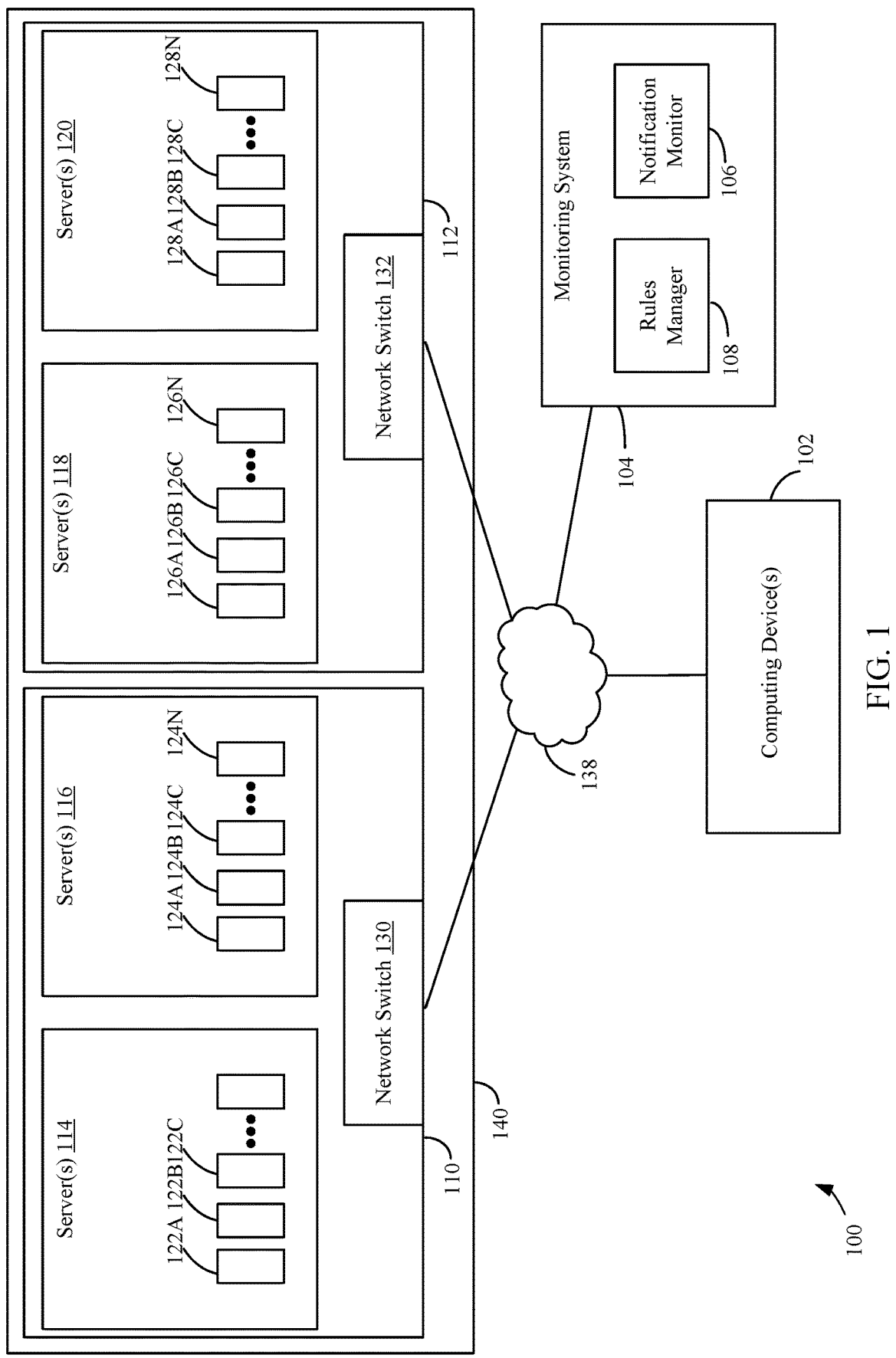
FIG. 1 is a block diagram of a network service system configured for notification throttling, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification and accompanying drawings disclose one or more embodiments that incorporate the features of the disclosed subject matter. The scope of the present patent application is not limited to the disclosed embodiments. The disclosed embodiments are merely exemplary, and modified versions of the disclosed embodiments are also encompassed. Embodiments of the present subject matter are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes, and are not limiting. The examples described herein may be adapted to any type of notification monitoring system or configuration. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Example Embodiments

The subject matter described herein relates to monitoring and incident management systems for delivering notifications, and more particularly to the intelligent throttling and management of notifications. For instance, in an embodiment, fast but limited bandwidth and/or expensive notification channels, such as text messaging or telephone calls, are throttled when large numbers of notifications over such channels are being sent, the notification recipients are notified of the throttling as soon as possible, and the recipients may be guided to another suitable and scalable notification channel (e.g., email, web user interface, desktop application, mobile application, etc.) to receive additional pending or ongoing status updates.

Embodiments are applicable to any systems where notifications are transmitted by devices to recipients. For instance, a cloud service such as Microsoft® Azure® may include one or more monitoring and incident management systems. Users of the cloud service, such as engineers, customers, maintenance professionals, may be interested in knowing the status of the cloud service. For example, engineers may need to be notified in case of an outage or general health and maintenance of one or more resources (e.g., virtual machines, subnet, cloud region, nodes). As another example, customers may want to be notified about any problems that occur with their services as well as other routine information useful to the customers such as utilization of resources, system updates, planned maintenance, etc. In such examples, numerous notifications may be sent by the monitoring systems to provide alerts and status updates to users.

In an embodiment, to provide relevant information to users faster, a monitoring system may be configured to define and store different classes of notifications in a hierarchical manner and allow for notifications from one class to be managed independently from notifications from another class. As a non-limiting example, messages regarding a system outage may be prioritized over user-configured alerts about resource utilization. The monitoring system may also be configured to limit or throttle the number of messages of the same class or content to be delivered to a recipient. While the classes may have priorities with respect to each other, notifications may be limited by throttle parameters specific to each class without the need to assign a class any priority with respect to any other class. For example, the limit may be applied in a transmission channel-specific manner (e.g., each different delivery channel may have a different delivery limit). For example, a delivery limit may be higher for email, 10 emails/hour, than for text messages, 2 messages/hour, or vice versa. Once the limit is reached, the monitoring system may notify the recipient that additional notifications may be available and provide a location such as a link to a suitable web user interface (UI) that displays all the notifications. The monitoring system may further provide scheduled automatic updates regarding the limiting of notifications on a predefined schedule after reaching the limit. Furthermore, the monitoring system may group many related notifications into a cumulative notification based on a set of rules and transmit the cumulative notification, or relay the related notifications as a group, to the recipient rather than transmit each notification separately.

Notification throttling may be implemented in various manners, in embodiments. For example, FIG. 1 shows a network service system 100 configured for notification throttling, according to an example embodiment. As shown in FIG. 1, system 100 includes a plurality of resource sets 110 and 112, one or more computing devices 102, and one or more instance of a monitoring system 104. Resource sets 110 and 112 (and any number of additional resource sets) define a network-accessible server infrastructure 140. In the example of FIG. 1, resource set 110 includes one or more servers 114, one or more servers 116, and a network switch 130, and resource set 112 includes one or more servers 118, one or more servers 120, and a network switch 132. Resource sets 110 and 112, computing device(s) 102, and monitoring system(s) 104 are communicatively coupled via network 138. Each monitoring system 104 is configured to intelligently throttle and manage notifications for system 100. As shown in FIG. 1, monitoring system 104 includes a rules manager 108 and a notification monitor 106. Though monitoring system 104 is shown separate from resource sets 110 and 112, in an embodiment, monitoring system(s) 104 may be included in one or more nodes in one or more of resource sets 110 and 112. Furthermore, any number of monitoring systems 104 may be present, such as one or more per resource set, one or more per resource, etc. Network 138 may comprise one or more networks such as local area networks (LANs), wide area networks (WANs), enterprise networks, the Internet, etc., and may include one or more of wired and/or wireless portions. In an embodiment, resource sets 110 and 112, computing device(s) 102, and monitoring system(s) 104 may communicate via one or more application programming interfaces (API).

Resource sets 110 and 112 may form a network-accessible server set, such as a cloud computing server network defined by network-accessible server infrastructure 140. For example, each of resource sets 110 and 112 may comprise a group or collection of servers (e.g., computing devices) that are each accessible by a network such as the Internet (e.g., in a "cloud-based" embodiment) to store, manage, and process data. For example, as shown in FIG. 1, resource set 110 includes servers 114 and 116, and resource set 112 includes servers 118 and 120 (which each include one or more servers). Each of resource sets 110 and 112 may comprise any number of servers, and may include any type and number of other resources, including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of system 100, etc.), and/or further types of resources. Servers of a resource set may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of a resource set may be co-located (e.g., housed in one or more nearby buildings with associated components such as backup power supplies, redundant data communications, environmental controls, etc.) to form a datacenter, or may be arranged in other manners. Accordingly, in an embodiment, resource sets 110 and 112 may each be a datacenter in a distributed collection of datacenters.

In accordance with such an embodiment, each of resource sets 110 and 112 may be configured to service a particular geographical region. For example, resource set 110 may be configured to service the northeastern region of the United States, and resource set 112 may be configured to service the southwestern region of the United States. It is noted that the network-accessible server set may include any number of resource sets, and each resource set may service any number of geographical regions worldwide.

Note that the variable "N" is appended to various reference numerals identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Each of server(s) 114, 116, 118, 120 may be configured to execute one or more services (including microservices), applications, and/or supporting services. As shown in FIG. 1, server(s) 114, 116, 118, 120 may each be configured to execute supporting services. A "supporting service" is a cloud computing service/application configured to manage a set of servers (e.g., a cluster of servers in servers 110) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of server(s) 114, 116, 118, 120 may be configured to execute any number of supporting services, including multiple instances of the same and/or different supporting services.

Computing device(s) 102 includes the computing devices of users (e.g., individual users, family users, enterprise users, governmental users, etc.) that may be tenants and/or that otherwise access network-accessible resource sets 110 and 112 for computing resources over network 138. Computing device(s) 102 may include any number of computing devices, including tens, hundreds, thousands, millions, or even greater numbers of computing devices. Computing devices of computing device(s) 102 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 102 may each interface with servers of server(s) 114, 116, 118, 120 through application programming interfaces (APIs) and/or by other mechanisms. Note that any number of program interfaces may be present.

As described above, a monitoring system 104 is configured to intelligently throttle and manage notifications for system 100. Monitoring system 104 may incorporated in any type of stationary or mobile computing device(s) described elsewhere herein or otherwise known. For instance, monitoring system(s) 104 may be incorporated in a network/cloud supporting service mentioned elsewhere herein or otherwise known.

Rules manager 108 of monitoring system 104 is configured to store information, including indications or definitions of multiple classes of notifications to be sent to recipients. In an embodiment, a recipient may have one or more means of contact. Thus, a target address for the recipient may include a telephone number, an email address, and/or other messaging address. As described herein, a "recipient" may be a receiving means for a user such as a computing device, a phone number, an email address associated with a corresponding email tool or repository, a text messaging number associated with a corresponding a text message repository, an instant messaging address associated with a corresponding an instant messaging repository, etc. In an embodiment, notifications are alerts to inform users of information about a system (e.g., a resource set accessed by the user) such as the system status, planned updates, maintenance schedules, activity logs, outages, etc. The notifications may be generated by one or more resources (e.g., computing devices/services of resource set 110). Furthermore, notifications may be configured by a user. For instance, a user may want a notification to be sent to the user once a particular resource utilization reaches a predefined amount or when there is a planned update to a particular virtual machine. The user may access a user interface to configure this type of notification by the resource. Notifications may have various forms, such as a telephone call, a text message, an email message, a message posted on a web UI or in an application, etc. In an embodiment, notifications may be organized according to the classes managed by rules manager 108. For instance, the classes may be arranged in a hierarchical order to allow notifications from one class to be prioritized over notifications from another class. In one example, regular alert notifications may be considered one class, while outage notifications may be considered another class. Other classes may include personal service health notifications, planned maintenance notifications, log notifications, user-created notifications, and system-created notifications.

In an embodiment, notification monitor 106 is configured to monitor notifications of one or more classes transmitted from resources/resource sets to each recipient over a period of time. For each recipient, notification monitor 106 may be configured to place the combination of a class and the recipient in a throttled mode by limiting the number of notifications of the class of notification transmitted to the recipient to a predefined threshold number per a corresponding period of time. In one illustrative example, notification monitor 106 may monitor the notifications regarding an outage sent to an email address and determine that ten email notifications regarding the outage have been sent over the last hour. If the predefined threshold for the email delivery channel for the outage class is ten emails per hour, notification monitor 106 may place the recipient email address in a throttled mode and transmit a message letting the recipient know that notifications for the outage have been throttled and that any additional, or all, notifications may be found at a web UI or elsewhere. Note that while notifications may be throttled for a particular recipient for a particular class, notifications from other classes to that particular recipient may or may not be throttled based on the nature of the notification, class definition, and/or the hierarchy of the respective classes. Moreover, there may be different thresholds for different delivery channels. For example, a user may receive far fewer text messages regarding an outage before being throttled than emails regarding the same outage within a window of time.

As an example, for a delivery channel, such as email or text message, the notification process may be performed by monitoring system 104 in the following way. When a first notification from a class is raised, that notification is delivered to the recipient immediately to achieve as short a notification time as possible for the initial notification. When subsequent notifications for the same recipient are raised, notification monitor 106 may check how many notifications of that class were sent to that recipient within a unit of time (e.g., within the last 10 minutes). If the throttling limit, a predefined threshold, for this notification channel is not reached, the subsequent notification will be sent immediately. If the throttling limit for the notification channel for this particular recipient and class has been reached, then notification monitor 106 may send a generic notification indicating that the recipient/class is placed in a throttled mode and where any additional notifications may be found. Reaching the throttling limit for a recipient for a first class of notifications does not prevent notifications of a second class from being delivered since the first and second classes are different from one another.

In example embodiments, notification monitor 106 is further configured to periodically check for new notifications within a throttling time window after a recipient is placed in the throttled mode. In response to determining that no new notifications are available within the throttling time window, notification monitor 106 may place the throttled recipient into a non-throttled mode with respect to the previously throttled class. In response to determining that one or more new notifications have been received within the throttling time window (having any suitable duration, including a minute, 15 minutes, an hour, etc.), notification monitor 106 may perform further checks to determine whether to transmit an update message to the recipient. For example, notification monitor 106 may check to see if the time since the last notification is more than the user update period, and if so, notification monitor 106 may facilitate the transmission of a progress update message or some other general message to the recipient. If the time since the last notification is not greater than the user update period, notification monitor 106 may withhold or defer transmitting such a message. Thus, while the recipient is placed in the throttled mode, notification monitor 106 can still periodically (e.g., once an hour) transmit an update message to notify the recipient of at least the number of notifications raised. This approach enables the throttled recipient to be made immediately aware of an ongoing service incident while intelligently managing the notifications such that so many are not sent that they become unmanageable. The user may have the option of receiving or not receiving periodic updates since the notifications are available via the Web UI.

In embodiments, notification monitor 106 is further configured to automatically group related notifications into a cumulative notification and to transmit the cumulative notification to a recipient. This mechanism allows for automatically grouping multiple similar notifications into one group, and then notifying the recipient only once about the group. The automatic grouping may be performed by notification monitor 106 in various ways, for example, by using correlation to identify grouping, de-duplication methods, machine learning-based grouping, specific service heuristics, etc.

Thus, the disclosed embodiments ensure that the user will receive notification of an event as soon as possible once the event is raised, but will not be flooded with multiple notifications in a short period of time. However, all notifications delivered and delayed due to throttling may be made available for review at a specified location such as a web site or web UI. When multiple issues are happening and multiple notifications are being raised, users may look to the web UI to monitor ongoing service status updates and notifications without having their phone, computer, or other messaging application/device overwhelmed with incoming notifications.

The techniques described herein are particularly beneficial for constrained notification channels like SMS. Such channels may be used to reach the user rapidly, but they are not designed to handle large number of notifications, and the user may incur costs for receiving such messages. Thus, different throttling limits may exist for each delivery channel to account for the unique features and advantages/disadvantages of each type of delivery channel. For example, the throttling limit of the SMS channel may be set much lower than the throttling limit of the email channel since it may be more cost effective to transmit relatively greater quantities of email notifications and easier for the user to review, or ignore, multiple email notifications. Regardless of the delivery channel, it remains beneficial to be able to constrain, limit or throttle the total number of notifications sent to a user to avoid massive floods of incoming notifications.

In example embodiments, a recipient may be a telephone number or an email address rather than an account, subscription ID or some other entity. This is because for larger customer organizations, it may be common to have multiple subscriptions/accounts, sometimes hundreds, managed by the organization. Certain groups in the organization may need to monitor all the subscriptions or accounts. Thus, if throttling is performed on a single account, it is still possible for the account owner to receive a large number of notifications from another account. This problem may be solved by applying the throttle limit on a per-recipient basis.

Figure 2:
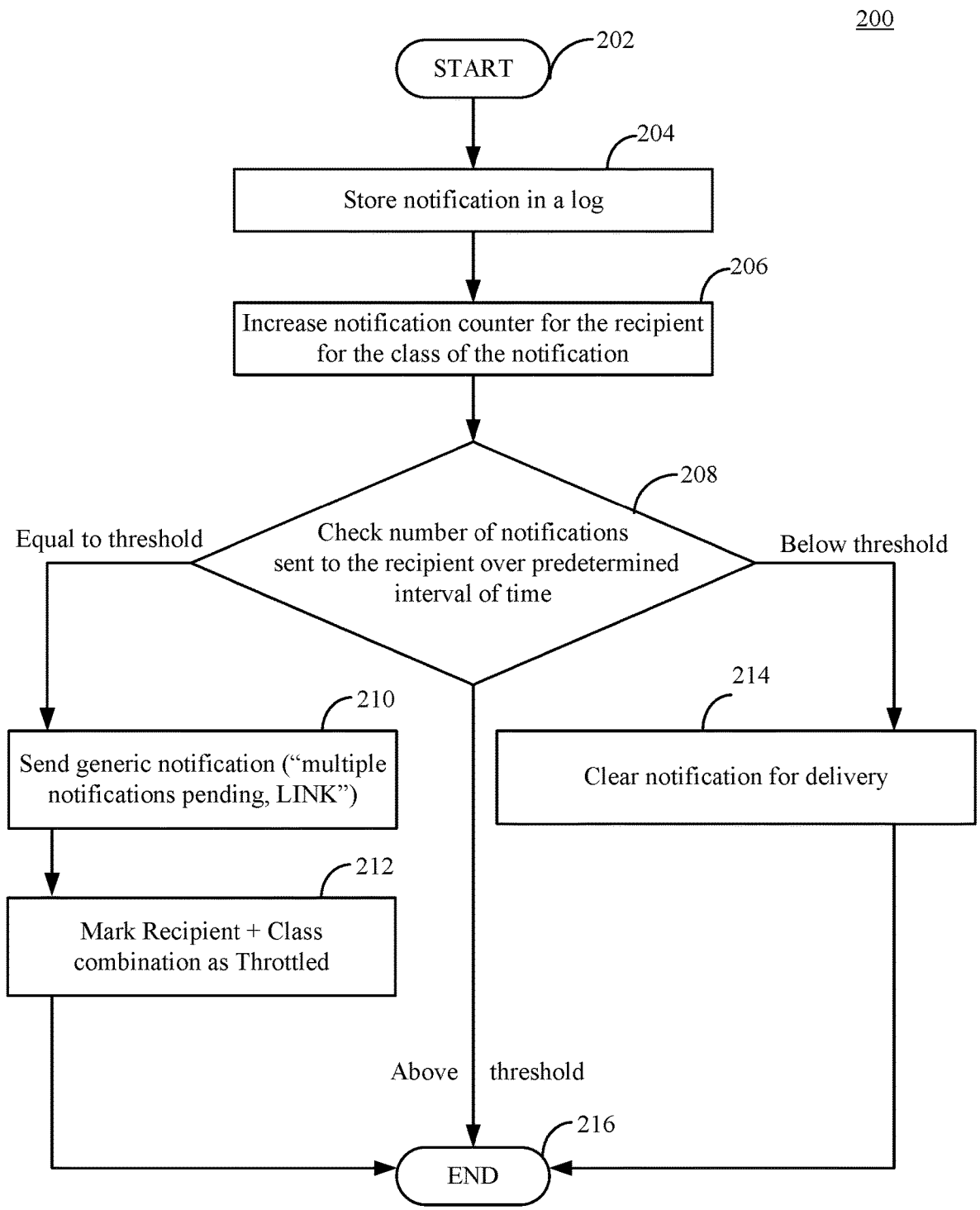
FIG. 2 is a flowchart of a notification throttling method, according to an example embodiment.

Embodiments described herein may be implemented in many ways. For instance, FIG. 2 depicts a flowchart 200 of a notification method in accordance with an example embodiment. In an embodiment, flowchart 200 may be implemented by monitoring system 104 shown in FIG. 1. Other structural and operation embodiments will be apparent to persons skilled in the relevant arts based on the following discussion regarding flowchart 200 and system 100 of FIG. 1.

Flowchart 200 begins with step 202. In step 202, a new notification may be raised or detected. For example, the new notification may be raised and transmitted by any portion of system 100, including a resource or monitoring system 104. The new notification may concern any type of notice or alert regarding any subject matter such as a system outage or status update generated by a particular cloud service.

In step 204, the new notification is stored in a log. For example, the new notification may be stored in a notification log (e.g., a log file) by rules manager 108 of FIG. 1. The notification log is used to maintain a record of every notification received (e.g., over a predetermined time period) and may store details related to the raising and transmission of each notification including the content, time, date, recipient etc. The notification log may be made accessible to a user through a web-based UI or other type of UI (e.g., of an application, etc.).

In step 206, a notification counter for the class of the notification for the recipient of the notification is increased. For example, notification monitor 106 may cause the notification counter for a class of notification for the recipient to increase by one when a new notification is raised. The class of the notification is specified by the notification itself or otherwise determined by monitoring system 104. The notification counter may be periodically reset or be decreased after a predetermined interval of time has elapsed since the reception of the last notification of the class.

In step 208, the number of notifications sent to the recipient over the predetermined interval of time is checked, for example, by notification monitor 106 of monitoring system 104 of FIG. 1. The check may be accomplished by referring to the notification log and examining the time and class of each notification received for the recipient over the predetermined interval of time to determine a number of notifications sent for the class (and each other class, if desired). If the number of notifications sent during the interval of time is determined to be below a predefined threshold, then flowchart 200 proceeds to step 214. If the number of notifications sent is determined to be equal to the predefined threshold, flowchart 200 proceeds to step 210. If the number of notifications sent is determined to be above the predefined threshold, the new notification is not sent and the notification process ends at step 216 without sending of the received notification—instead, the recipient will have previously received a generic notification when the threshold was for the class was first reached and was notified where copies of the throttled notifications may be found.

In step 210, a generic notification such as "multiple notifications pending" may be sent to the recipient, and providing a link (e.g., hyperlink) to a web-based UI (or otherwise situated UI) where copies of some or all the notifications may be stored. Flowchart 200 proceeds to step 212

In step 212, the recipient and class combination is placed in a throttled mode. For instance, the recipient and class combination may be marked as "throttled", and the notification process ends in step 216. Steps 210 and 212, for example, may be performed by monitoring system 104 of FIG. 1.

In step 214, the new notification is cleared for delivery to the recipient and the notification process subsequently ends in step 216. For example, if a notification is the first notification received in a particular class during the predetermined time interval, the notification is simply sent to the recipient and notification monitor 106 waits for the next notification to be raised or received. Step 214, for example, may be performed by monitoring system 104 of FIG. 1.

Accordingly, limiting the number of notifications sent to a recipient based upon a class of the notification allows the recipient to be timely informed of any type of event but not overwhelmed with duplicative notifications. Furthermore, because a link to the complete set of notifications is sent to the recipient, none of the information contained in the notifications, including any metadata, has been lost to the recipient, but may instead be accessed at the link address.

Figure 3:
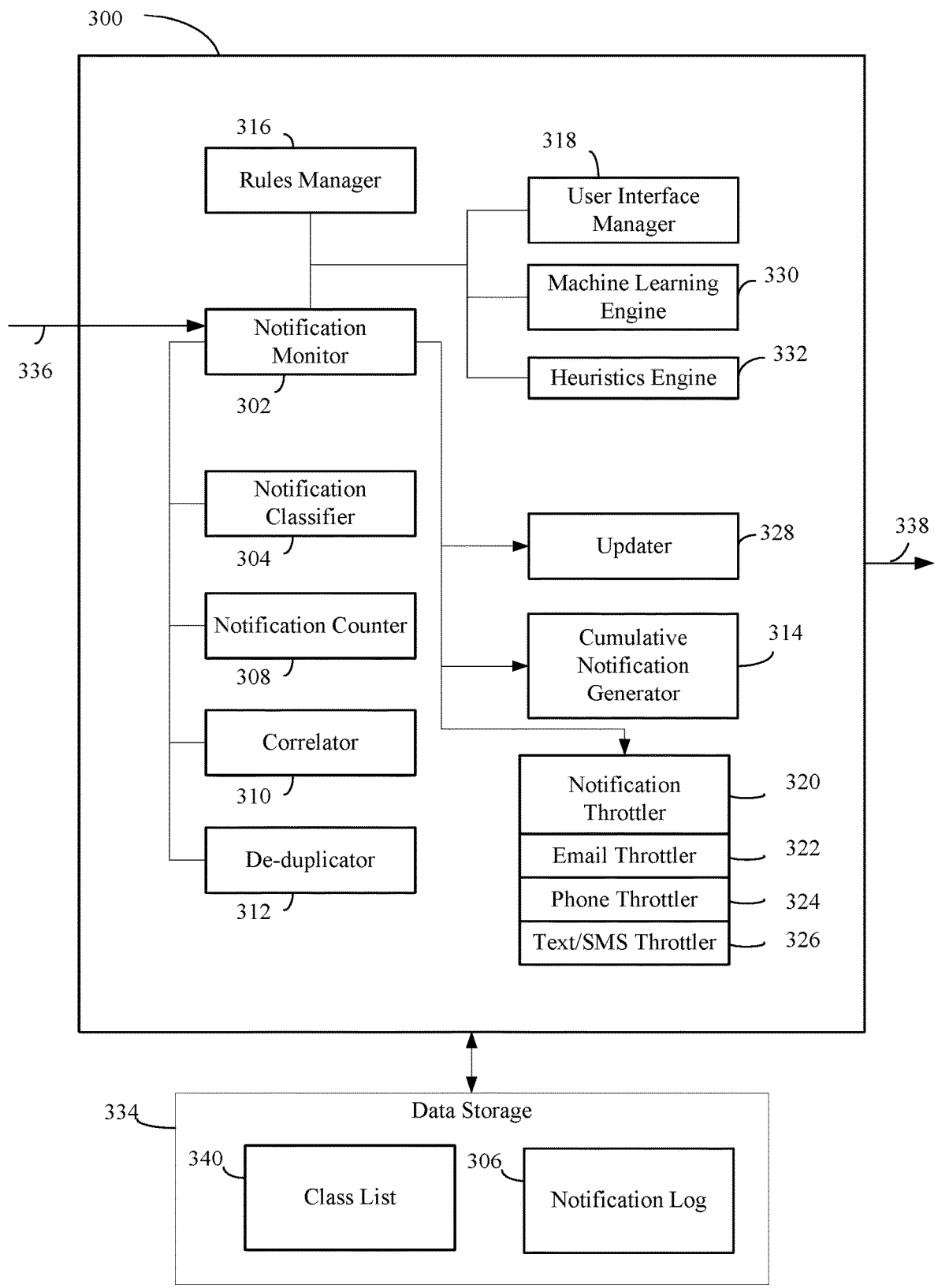
FIG. 3 is a block diagram for a notification throttling system, according to an example embodiment.

Note that monitoring system 104 of FIG. 1 may be implemented in various ways to perform its functions. For instance, FIG. 3 is a block diagram for a notification throttling system 300 in accordance with an example embodiment. Notification throttling system 300 is an example embodiment of monitoring system 104, and/or may be implemented in a notification monitoring system. As shown in FIG. 3, notification throttling system 300 is coupled to a data storage 334. Notification throttling system 300 includes a notification monitor 302, a notification classifier 304, a notification counter 308, a correlator 310, a de-duplicator 312, a cumulative notification generator 314, a rules manager 316, a user interface manager 318, a notification throttler 320, an email throttler 322, a phone throttler 324, a text/SMS throttler 326, an updater 328, a machine learning engine 330, and a heuristics engine 332. Notification monitor 302 is an example of notification monitor 106, and rules manager 316 is an example of rules manager 108 of FIG. 1. As shown in FIG. 3, data storage 334 stores a class list 340 that is a list of notification classes, and a notification log 306 used to store data related to notifications. The features of FIG. 3 are further described as follows.

Notification monitor 302 of notification throttling system 300 receives one or more notifications 336, such as messages, alerts, etc., that are to be sent a recipient. Notification monitor 302 monitors notifications 336, accessing each notification prior to their being sent to the recipient. Notifications 336 may be generated by the notification monitor 302 itself or received from a connected system such as network-accessible server infrastructure 140 (e.g., a cloud service) or other entity or resource that generates notifications relating to its status and/or operations. Notifications 336 may each have the form of a telephone call, text message, email message, message posted on a web UI or in an application, or other suitable form. Notification throttling system 300 generates output messages 338, which may include notifications (e.g., re-transmission of notifications 336), updates, cumulative messages, user messages, and/or other output messages as discussed in more detail herein.

Rules manager 316 is configured to store information that indicates or defines classes of notifications that may be sent to a recipient for use by notification monitor 302. For example, as shown in FIG. 3, rules manager 316 may store and maintain class list 340 in storage 334. Class list 340 may have any suitable form (e.g., a table, an array, a database, etc.) and may indicate any number of classes. Each class may be indicated with a class identifier (e.g., an alphanumeric code, a name, etc.), a description of the particular class, class tags that may be present in notifications to indicate the notifications as belonging to the particular class, and/or further class-defining information. Furthermore, rules manager 316 may configure class list 340 to include data regarding recipients, including predetermined threshold numbers of notifications in each class that each recipient may receive before throttling notifications to the recipient, including each address for the recipient. For example, a particular recipient may have both a telephone number and an email address for receiving notifications. Rules manager 316 may define rules related to how many notifications can be sent to the telephone number and to the email address, and may store the corresponding threshold numbers in class list 340. The particular threshold number that can be sent and the interval over which the threshold is measured are also contained in class list 340, or managed by, rules manager 316. Rules manager 316 may also define rules that are class specific in a throttling ruleset for each class. For example, notifications assigned the highest importance may be sent without consideration of whether or not a prior notification has been previously transmitted to the recipient.

Notification classifier 304 classifies notifications 336 received by notification monitor 304. The classification may be specified by the notification itself or determined by notification classifier 304 based upon a set of rules or criteria. For instance, notification classifier 304 may access class list 340 for class tags that define corresponding classes, and classify a notification in a class due to the notification containing one or more of the class tags of the class. In an embodiment, notification classifier 304 may perform step 206 of FIG. 2 to determine the class of the received notification.

Notification counter 308 counts the notifications that are received by notification monitor 304. The notification counts maintained by notification counter 308 may include counts specific to a class or channel (e.g., for notifications identified as belonging to a class by notification classifier 304), and/or include an overall notification count. In an embodiment, notification counter 308 may perform step 206 of FIG. 2 to keep a record of the number of received notifications in the class.

Correlator 310 is configured to identify related notifications received by notification monitor 302. For example, correlator 310 may be used to determine that a recent notification is related to the same issue as a prior notification (e.g., due to containing similar words, by being received from a same or related resource, etc.). Correlator 310 can also be used by notification classifier 304 to help determine the class of the received notification (e.g., by related messages being assigned to a same class) and by cumulative notification generator 314 to help determine which notifications are related to a same issue. In an embodiment, correlator 310 may participate in performing step 206 of FIG. 2 to determine that the class of a recently received notification is the same as the class of a prior notification.

De-duplicator 312 is configured to identify and/or eliminate notifications that are duplicates of a prior received notification. Recipients may be configured to receive alerts from several different monitors of a cloud service system with the result being that certain outages will result in duplicate notifications being raised and sent to the recipient. De-duplicator 312 detects and optionally eliminates notifications that are duplicates, and in connection with cumulative notification generator 314, helps detect when a cumulative notification is appropriate to transmit.

Cumulative notification generator 314 is configured to generate a cumulative notification that replaces a number of similar or identical notifications. The decision to send a cumulative notification may be dependent upon the transmission channel to be used for the notification, the class or priority of the notification, and/or the number of notifications received for a particular recipient regarding the same issue over a predetermined interval of time exceeding a threshold. In an embodiment, cumulative notification generator 314 may perform step 210 of FIG. 2 to generate the generic notification.

User interface manager 318 is configured to provide a user interface that can be interacted with to adjust operating parameters of notification monitor 302. By interaction with the user interface, a user or administrator can define one or more notification classes, set and/or alter the thresholds for each class. User interface manager 318 may be configured to define the classes and set the thresholds discussed with respect to flowchart 200 of FIG. 2.

Notification throttler 320 is configured to limit the number and nature of the notifications sent to a recipient in a given interval of time, which may be a sliding window of time. As discussed in more detail elsewhere herein, the notifications may be limited based upon the class of the notification determined by notification classifier 304 and/or the number of notifications counted by the notification counter 308. In an embodiment, notification throttler 320 may include any number of separate throttlers for corresponding transmission channels. For example, email throttler 322 may be present and configured to manage and limit notifications sent to a recipient via email. Phone throttler 324 may be present and configured to manage and limit voice messages sent to a recipient via a telephone connection. Text/SMS throttler 326 may be present and configured to manage and limit text notifications sent to a recipient via a SMS messaging service as discussed in more detail herein. While the embodiment of FIG. 3 includes separate throttlers corresponding to email, text, and phone transmission channels, these throttlers are exemplary and any other type of transmission channel throttler, such as an application-based transmission channel throttler, may be present.

Updater 328 manages and generates the sending of update messages to a recipient based on the throttled or non-throttled state of the recipient with regard to the reception of notifications. For example, if the user is in a throttled condition for a particular class, and no new notifications have been received during an update interval of time for the class, an update message may be generated by updater 328 that informs the recipient that a throttled condition for the recipient has been removed for that class, and that no new notifications have been received during the period of time.

Machine learning engine 330 is configured to be utilized by notification monitor 302 to perform machine learning-based grouping of notifications raised by the monitor 302 into a cumulative notification. For instance, machine learning engine 330 may analyze patterns of notifications received by users and maintained or discarded by the users, the timings of transmissions of similar notifications, and or other parameters of notifications to automatically group together notifications. Heuristic Engine 332 can also be utilized by notification monitor 302 to provide service specific heuristics when grouping notifications into a cumulative notification.

Monitoring system 104 of FIG. 1, including embodiments thereof such as notification throttling system 300 of FIG. 3, may be configured to perform various processes related to the throttling of notifications. For instance, FIGS. 4-9 show flowcharts of processes related to the throttling of notifications that may be performed by monitoring system 104 of FIG. 1 and notification throttling system 300. The flowcharts of FIGS. 4-9 are described as follows with reference to monitoring system 104 of FIG. 1 and notification throttling system 300 for purposes of illustration. Note that the steps of each of the flowcharts of FIGS. 4-9 need not necessarily be performed in the orders shown, and in each flowchart, not all steps need be performed in all embodiments. Furthermore, each flowchart may contain additional steps not shown, including steps shown for other flowcharts. Other structural and operation embodiments will be apparent to persons skilled in the relevant art(s) based on the following discussion regarding the flowcharts of FIGS. 4-9.

Figure 4:
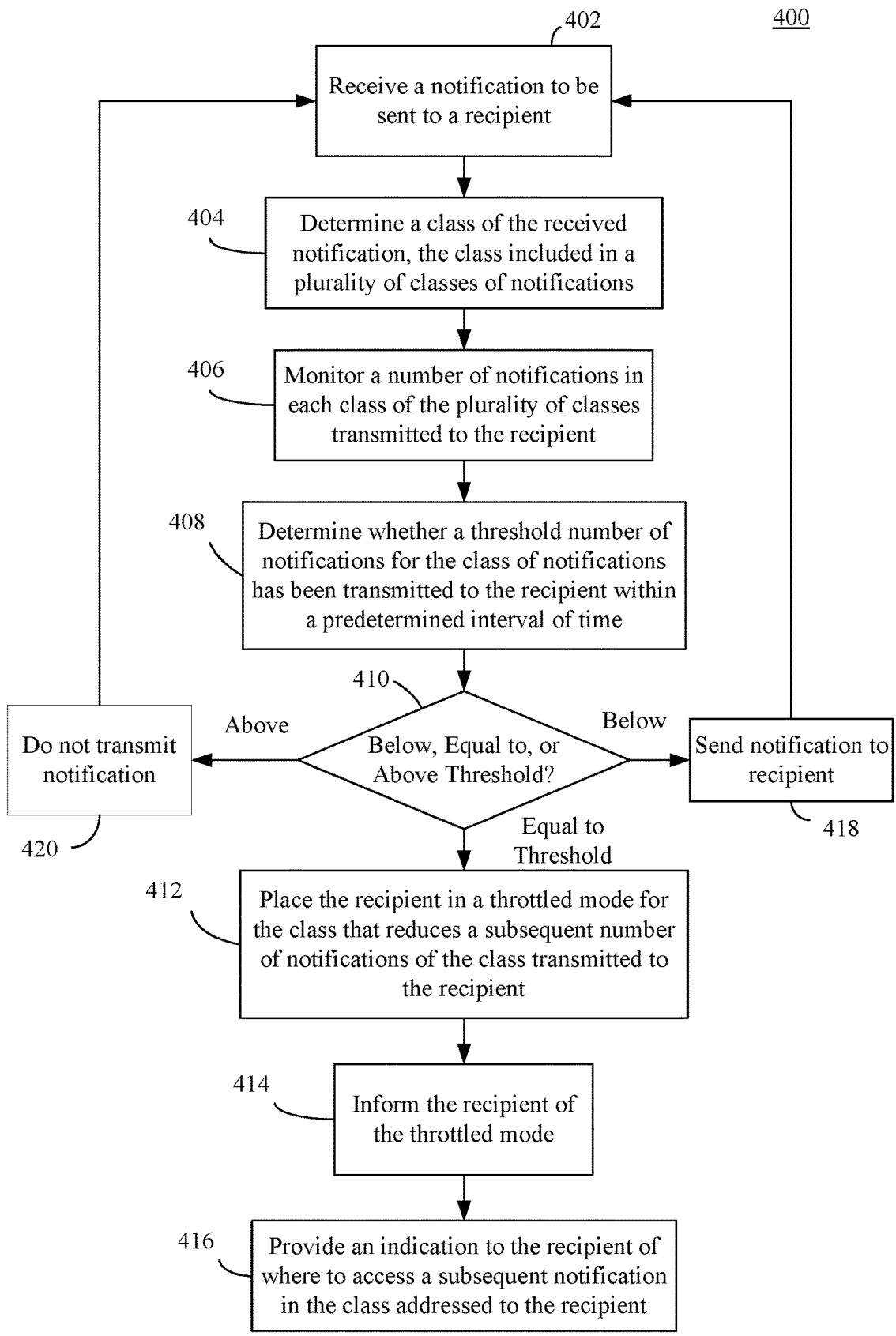
FIG. 4 is a flowchart of a method of placing a recipient in a throttled mode, according to an example embodiment.

For instance, FIG. 4 is a flowchart 400 of a method of placing a recipient in a throttled mode, according to an example embodiment. Flowchart 400 begins in step 402 with the receiving of a notification to be sent to a recipient. For example, as shown in FIG. 3, notification monitor 302 of notification throttling system 300 may receive notification 336, which is directed to a recipient.

In step 404, a class, which is included in a plurality of classes of notifications, of the received notification is determined. Step 404 may for example be performed by notification classifier 308. As described above, the class of notification 336 may be specified in notification 336 itself, by the system raising notification 336, or determined by notification classifier 308 by other technique (e.g., determining class tags in notification 336, etc.).

In step 406, the number of notifications in each class of the plurality of classes transmitted to the recipient is monitored. Step 406 may for example be performed by notification counter 308 of FIG. 3, which is configured to count the number of transmitted notifications per class. The notification count may be limited to notifications received in a sliding time window with notifications outside of the window not included in the count.

In step 408, it is determined whether a threshold number of notifications for the class of notifications has been transmitted to the recipient within a predetermined interval of time. In an embodiment, notification counter 308 may compare the number of notifications transmitted to the recipient within the predetermined interval of time to determine whether it matches a predetermined threshold number of notifications corresponding to that user and notification class.

In step 410, in response to notification counter 308 determining that the number of transmitted notifications in the class is less than the threshold number, flowchart 400 proceeds to step 418. In response to notification counter 308 determining that the number of transmitted notifications in the class equals the threshold number, flowchart 400 proceeds to step 412. In response to notification counter 308 determining that the number of transmitted notifications in the class is greater than the threshold number, flowchart 400 proceeds to step 420.

In step 412, the recipient is placed in a throttled mode for the class that reduces a subsequent number of notifications of the class transmitted to the recipient. In an embodiment, notification throttler 320 may be instructed by notification monitor 302 to place the recipient in the throttled mode based on the determination made by notification counter 308.

In step 414, the recipient is informed of the throttled mode. In an embodiment, updater 328 may transmit a message to the recipient to inform the recipient of being placed in the throttle mode with respect to the class.

In step 416, an indication is provided to the recipient of where to access a subsequent notification in the class addressed to the recipient. In an embodiment, updater 328 may indicate in the transmitted message (or subsequent message) a location (e.g., providing a web link in the message) where to access subsequent notifications for the class. Operation of flowchart 400 ends.

In step 418, the notification is sent to the recipient. In an embodiment, notification monitor 302 enables the notification to be transmitted to the recipient in output messages 338. Flowchart 400 then proceeds back to step 402 where notification monitor 302 waits for a next notification to be received.

In step 420, the notification is not transmitted to the recipient. In an embodiment, notification monitor 302 prevents the notification from being transmitted to the recipient in output messages 338. Flowchart 400 then proceeds back to step 402 where notification monitor 302 waits for a next notification to be received.

Figure 5:
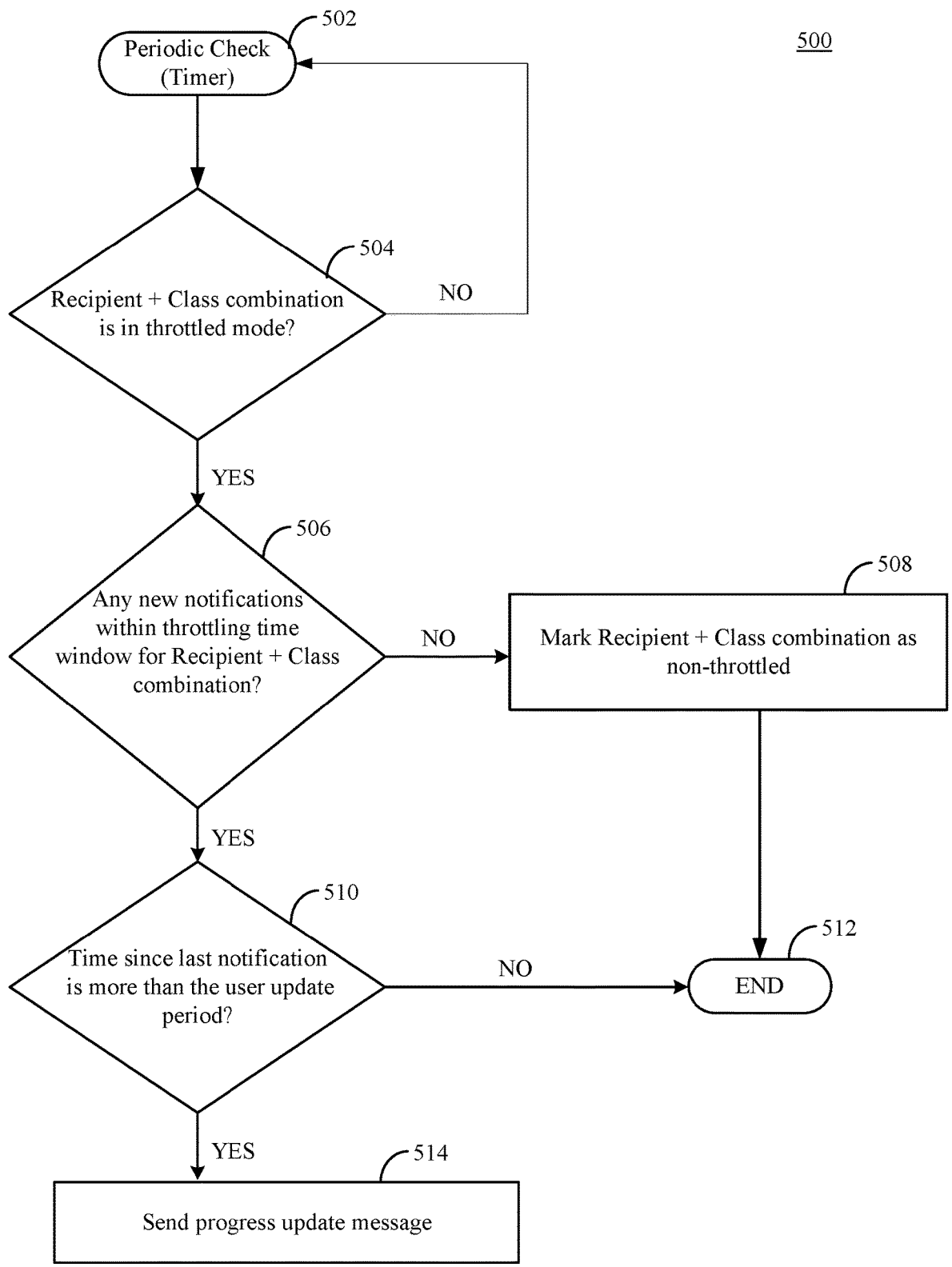
FIG. 5 is a flowchart of a method of managing a throttled mode, according to an example embodiment.

As another example, FIG. 5 is a flowchart 500 of a method of managing a throttled mode by periodically checking throttled recipients based on a timer, according to an example embodiment. Flowchart 500 begins with step 502. In step 502, a timer triggers a periodic check. For example, notification monitor 106 may include or have access to a timer to measure a length of time each throttled recipient is in their respective throttled mode. The timer may be configured to trigger periodic checks, to monitor one or more time windows, and/or to otherwise measure time of throttling.

In step 504, a check is performed to determine whether a recipient and class combination is in a throttled mode. For example, notification monitor 106 may access notification throttler 320 or otherwise determine whether a class of notification has been throttled for a recipient. If the recipient and class combination are not in the throttled mode, flowchart 500 proceeds back to step 502. If the recipient and class combination are in the throttled mode, flowchart 500 proceeds to step 506.

In step 506, a check is performed to determine whether there are any new notifications that have been received within a throttling time window for the recipient and class combination. In an embodiment, notification monitor 302 monitors for new notifications during a throttling time window set for the recipient and class. If no new notifications are received during the throttling time window, flowchart 500 proceeds to step 508. If new notifications are raised within the throttling time window, flowchart 500 proceeds to step 510.

In step 508, the recipient and class combination is marked as non-throttled and operation of flowchart 500 proceeds to step 512. For example, notification monitor 302 of FIG. 3 may determine that there are no new notifications within a throttling time window for the recipient and class combination and place the recipient and class combination in a non-throttled mode, such as by instructing notification throttler 320 to stop throttling notifications in the class to the recipient.

In step 510, a check is performed to determine whether the time since the last notification is more than the user update period. For example, a user may set a desired update period (e.g., fifteen minutes, an hour, etc.). In this embodiment, notification monitor 106 may determine whether the time since the last notification is greater than the desired user update period. If the time since the last notification is found to be greater than the desired update period, flowchart 500 proceeds to step 514. If the time is found to be less than the desired update period, then flowchart 500 of FIG. 5 proceeds to step 512.

In step 512, operation of flowchart 500 ends.

In step 514, a progress update message is sent to the recipient. In an embodiment, updater 328 may transmit a progress update message to the recipient. The update message may relate to the status of an event such as a system outage or notify the recipient of the number of pending notifications available. For example, a message stating "5 new notifications received since last update" may be sent to the recipient by updater 328 of FIG. 3. Operation of flowchart 500 ends.

Figure 6:
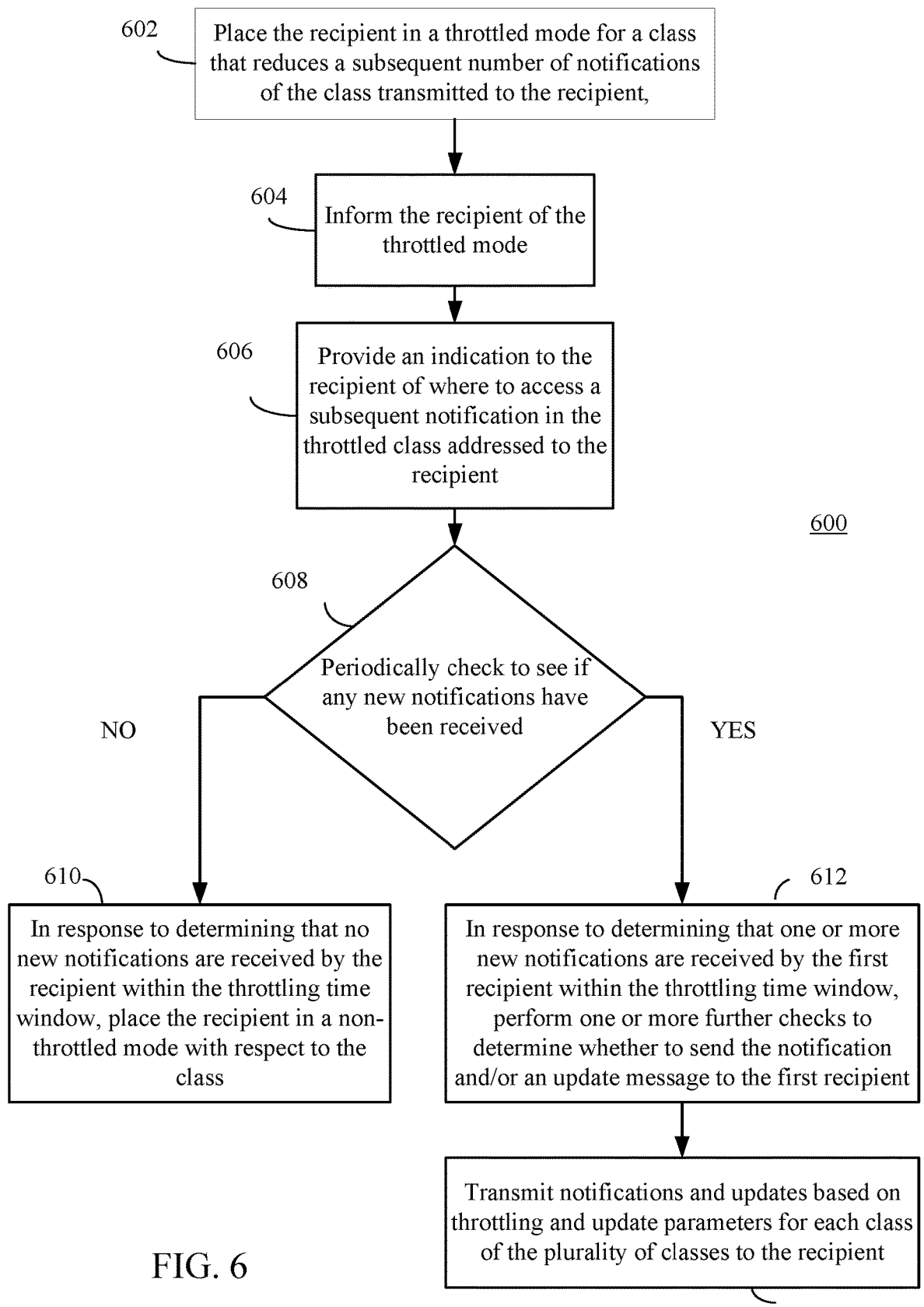
FIG. 6 is a flowchart of a method of managing a throttled mode, according to an example embodiment.

FIG. 6 is a flowchart 600 of a method of managing a throttled mode for a recipient and class, according to another example embodiment. In flowchart 600, a non-throttled class of notifications is transmitted to a recipient even if the recipient is in a throttled mode for another class. Flowchart 600 of FIG. 6 can, for example, be performed by notification throttling system 300 of FIG. 3 or monitoring system 104 of FIG. 1.

Flowchart 600 begins in step 602. In step 602, the recipient is placed in a throttled mode for the class that reduces a subsequent number of notifications of the first class transmitted to the recipient. For example, as described above, notification throttler 320 may place a recipient in a throttled mode for notifications of a particular class.

In step 604, the recipient is informed of the throttled mode. In an embodiment, updater 328 may transmit a message to the recipient to inform the recipient of being placed in the throttle mode with respect to the class.

In step 606, an indication is provided to the recipient of where to access a subsequent notification in the first class addressed to the recipient. In an embodiment, updater 328 may indicate in the transmitted message (or subsequent message) a location (e.g., providing a web link in the message) where to access subsequent notifications for the class.

In decision step 608, a periodic check is performed to see if any new notifications have been received. In an embodiment, notification monitor 302 periodically checks for new notifications during a throttling time window set for the recipient and class. In response to determining that no new notifications are received by the recipient within the throttling time window in step 608, flowchart 600 proceeds to step 610. In response to determining that one or more new notifications are received by the recipient within the throttling time window in the step 608, flowchart 600 proceeds to step 612.

In step 610, the recipient is placed in a non-throttled mode with respect to the first class. For example, notification monitor 302 of FIG. 3 may place the recipient and class combination in a non-throttled mode, such as by instructing notification throttler 320 to stop throttling notifications in the class to the recipient.

In step 612, one or more further checks are performed to determine whether to send an update message to the first recipient. In an embodiment, notification monitor 302 may be configured to determine, based on the new notification, whether an update message should be sent to the recipient. For example, if the received notification is in a different class than the throttled class, it may be sent to the recipient as a result of the recipient being in a throttled mode for the first class but not the different class.

In step 614, notifications are transmitted to the recipient based on throttling parameters or rules for each class of the plurality of classes while the recipient is in the throttled mode for the first class. For example, notification monitor 302 may enable notifications in class B to be transmitted to the recipient while the recipient is in a throttled mode with respect to class A notifications, while class C notifications may not be transmitted to the recipient while the recipient is in a throttled condition with respect to class A notifications. Operation of flowchart 600 ends.

Figure 7:
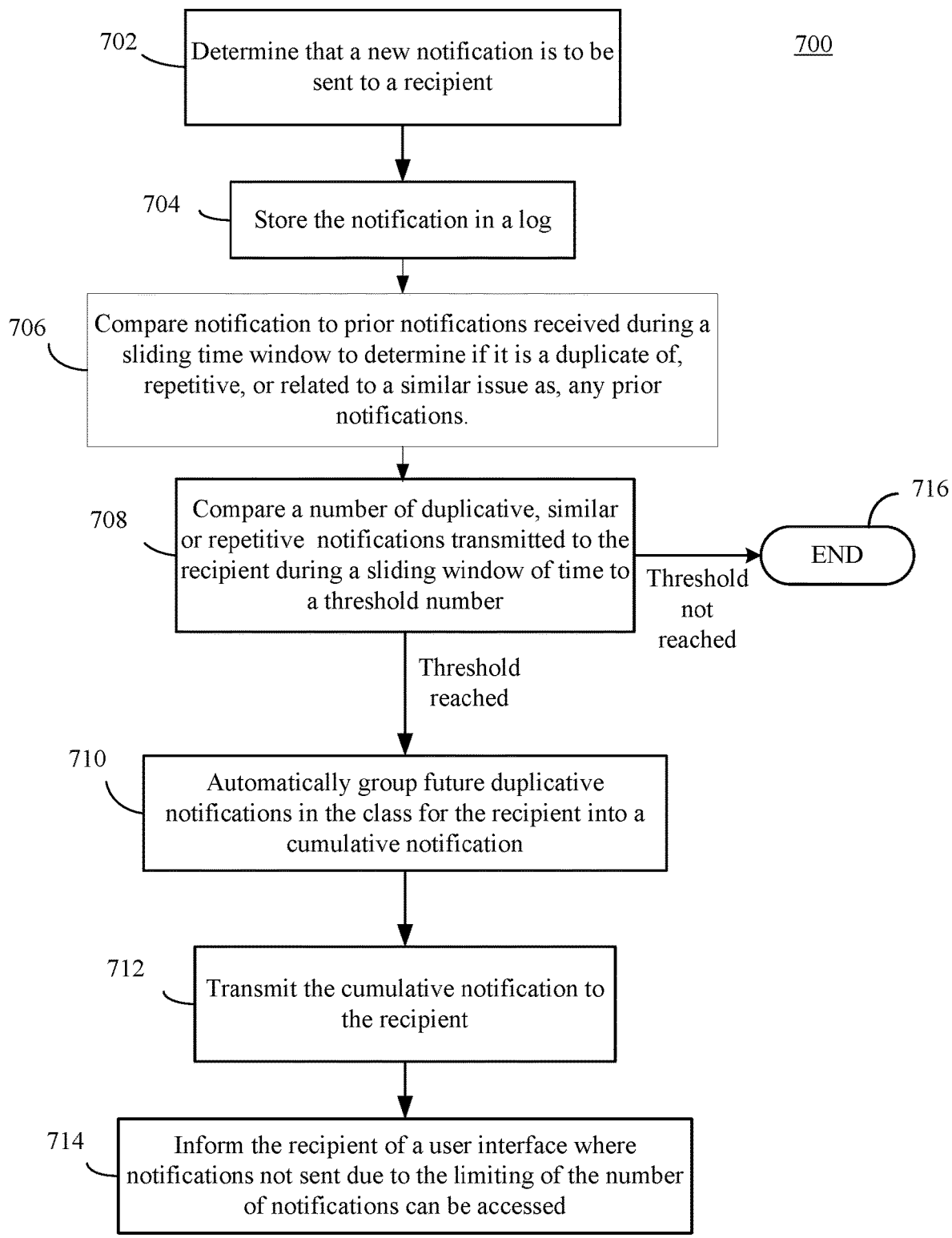
FIG. 7 is a flowchart of a method of transmitting a cumulative notification, according to an example embodiment.

FIG. 7 is a flowchart 700 of a method of transmitting a cumulative notification, according to an example embodiment. Flowchart 700 of FIG. 7 begins in step 702. In step 702, whether a new notification is to be sent to a recipient is determined. For example, as shown in FIG. 3, notification monitor 302 of notification throttling system 300 may receive notification 336, which is directed to a recipient.

In step 704, the notification is stored in a log. For instance, as described above, notification monitor 302 may store information of the received notification in notification log 306.

In step 706, the notification is compared to prior notifications received during a sliding time window to determine if it is a duplicate of, repetitive, or related to a similar issue as, any prior notifications. For example, step 706 may be performed by de-duplicator 312 and correlator 310 of FIG. 3. If multiple notifications are being raised regarding a system outage, and a recipient has already been sent three notifications regarding the outage, de-duplicator 312 and/or correlator 310 may determine the duplicates, and any future notifications regarding the same issue can be withheld from transmission to the recipient until expiration of a throttling condition as discussed herein.

In step 708, a number of duplicative, similar or repetitive notifications transmitted to the recipient during a sliding window of time is compared to a threshold number of notifications. Step 708 may be performed, for example, by notification counter 308 of FIG. 3. If the threshold number has not been reached by a count of duplicate notifications made by notification counter 308, operation proceeds to step 716. If the threshold number of duplicative notifications has been reached, operation proceeds to step 710.

In step 710, future duplicative notifications in the class for the recipient are automatically grouped into a cumulative notification. For example, cumulative notification generator 314 may be configured to group the duplicative notifications into a cumulative notification for the class. Cumulative notification generator 314 may group the notifications based upon classes specified in the notifications themselves, characteristics of the notifications determined by the notification monitoring system, and/or based on other factors.

In step 712, the cumulative notification is transmitted to the recipient. Note that a decision to transmit the cumulative notification may be rule-based and/or configured by a user (e.g., an administrator). For example, a rule may require the sending of a cumulative notification at scheduled intervals, after a set number of cumulative notifications have been received and/or according to another schedule or algorithm. For instance, the rules for transmitting a cumulative notification may be varied over the course of a day to take into account staffing levels and daily routines (e.g., for a business, fewer cumulative notifications may be transmitted during non-business hours due to fewer users available to read the notifications). In an embodiment, updater 328 is configured to transmit the cumulative notification to the recipient in output messages 338.

In step 714, the recipient is informed of a user interface where notifications not sent due to the limiting of the number of notifications can be accessed. In an embodiment, updater 328 may indicate in the transmitted message (or subsequent message) a location (e.g., providing a web link in the message) where to access subsequent notifications for the class. For example, a cumulative notification such as "more than 3 notifications received for system outage, access future notifications at link" may be transmitted to the recipient. Operation of flowchart 700 ends.

In step 716, operation of flowchart 700 ends.

Figure 8:
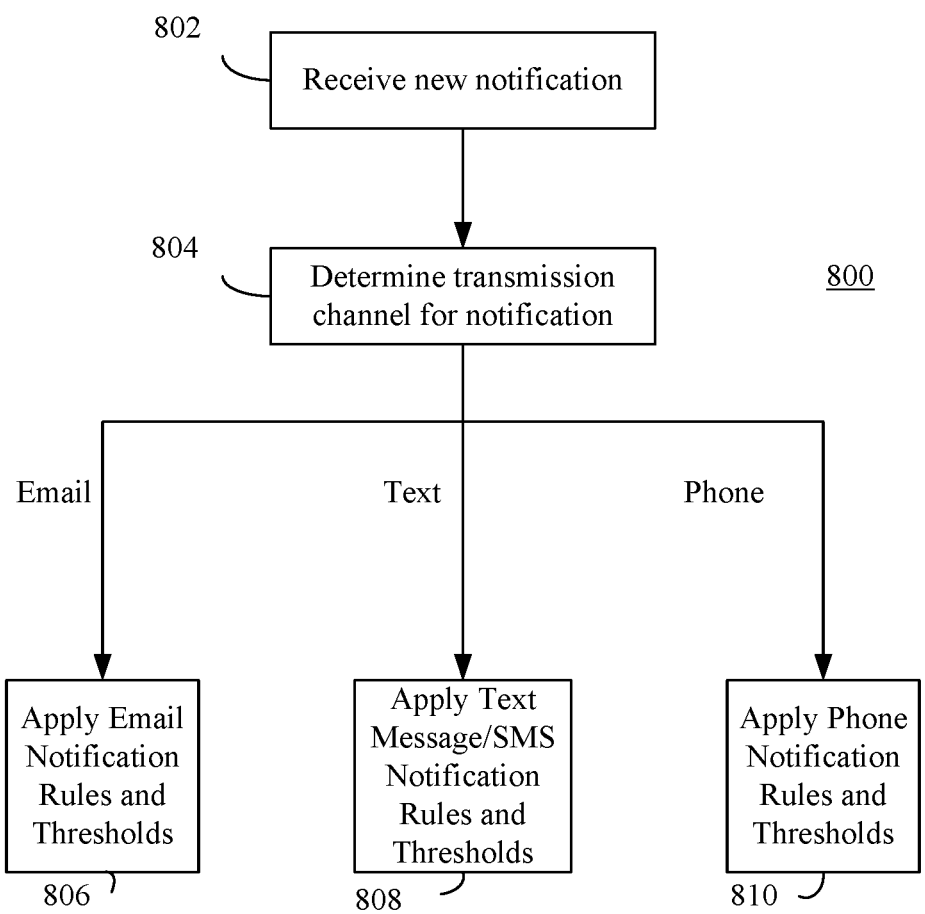
FIG. 8 is a flowchart of a channel specific method of throttling notifications, according to an example embodiment.

In another embodiment, FIG. 8 is a flowchart 800 of a channel specific method of throttling notifications. Flowchart 800 begins in step 802. In step 802, a new notification is received that is to be sent to a recipient. For example, as shown in FIG. 3, notification monitor 302 of notification throttling system 300 may receive notification 336, which is directed to a recipient.

In step 804, a transmission channel for the notification is determined. In an embodiment, notification monitor 302 determines the transmission channel for the notification. For instance, the transmission channel may be specified by notification 336 itself or be determined in another manner. If the transmission channel is determined to be email, flowchart 800 proceeds to step 806. If the transmission channel is determined to be text message, flowchart 800 proceeds to step 808. If the transmission channel is determined to be a phone message, flowchart 800 proceeds to step 810.

In step 806, email notification rules and thresholds are applied to determine if the notification should be sent or not. As an example, step 806 can be performed by email throttler 322 of FIG. 3. Such email notification rules and thresholds may be applied by email throttler 322 for email notifications in a similar fashion as the notification throttling described above with respect to FIGS. 1-7.

In step 808, text message/SMS notification rules and thresholds are applied to determine if the notification should be sent or not. As an example, step 808 can be performed by Text/SMS throttler 326 of FIG. 3. Such Text/SMS notification rules and thresholds may be applied by Text/SMS throttler 326 for email notifications in a similar fashion as the notification throttling described above with respect to FIGS. 1-7.

In step 810, phone message notification rules and thresholds are applied to determine if the notification should be sent or not. As an example, step 810 can be performed by phone throttler 324 of FIG. 3. Such phone message notification rules and thresholds may be applied by phone throttler 324 for phone message notifications in a similar fashion as the notification throttling described above with respect to FIGS. 1-7. While the embodiment of FIG. 8 includes separate rules and thresholds for email, text and phone transmission channels, the transmission channels shown are only exemplary additional transmission channels and any other type of transmission channel, such as an application based transmission channel, may be provided with its own throttling ruleset (containing one or more throttling rules and/or parameters) and thresholds as desired.

Figure 9:
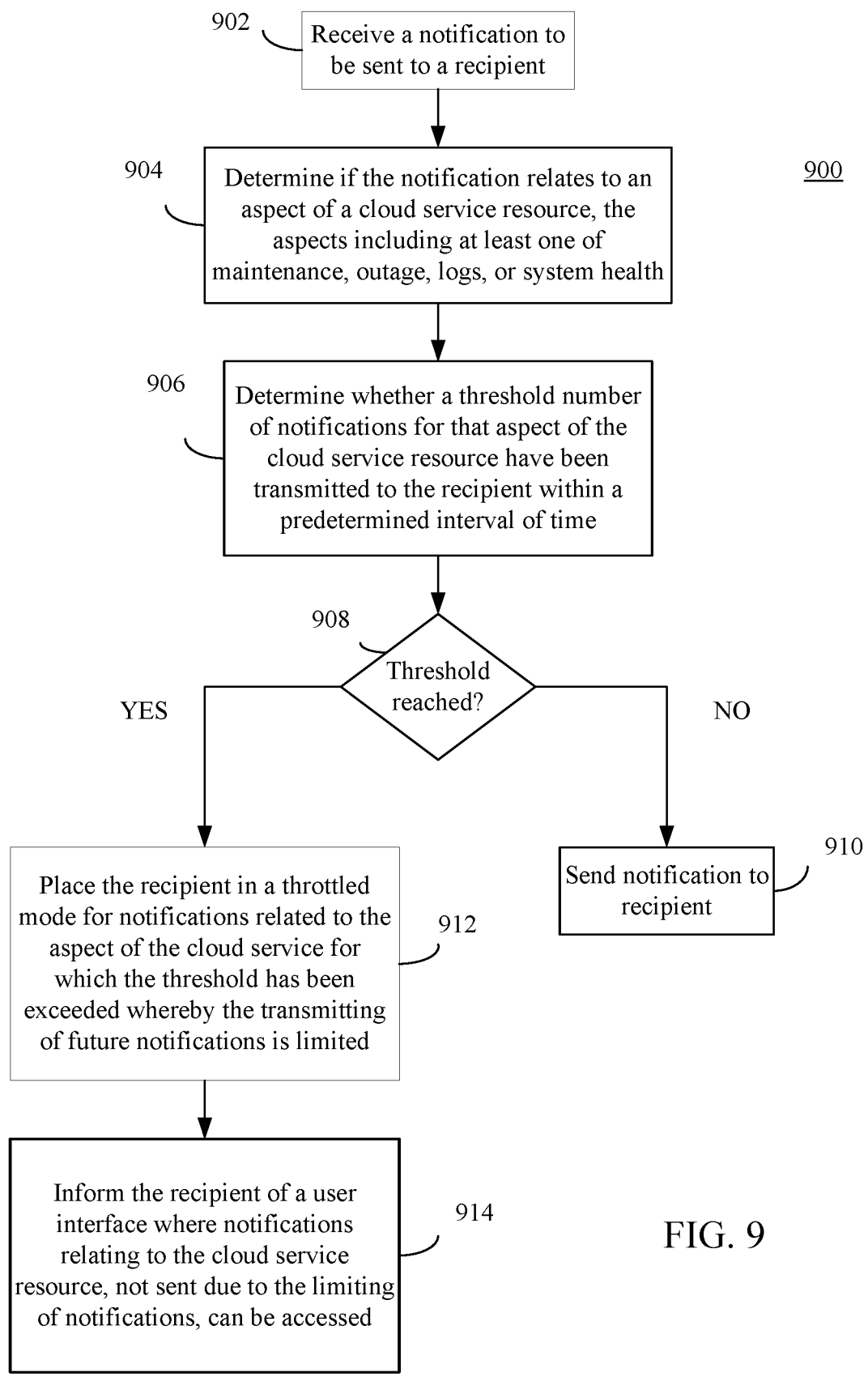
FIG. 9 is a flowchart of a notification monitoring method for a cloud service resource, according to an example embodiment.

FIG. 9 is a flowchart 900 of a notification monitoring method for a cloud service resource, according to an example embodiment. Flowchart 900 begins in step 902. In step 902, a notification is received to be sent to a recipient. For example, as shown in FIG. 3, notification throttling system 300 may receive notification 336, which is directed to a recipient.

In step 904, it is determined if the notification relates to an aspect of a cloud service resource, the aspects including at least one of maintenance, outage, logs, or system health. For instance, notification monitor 302 may be configured to parse received notifications for keywords, tags, and/or other parameters that indicate that a notification relates to maintenance, outage, logs, or system health.

In step 906, it is determined whether a threshold number of notifications for that aspect of the cloud service resource have been transmitted to the recipient within a predetermined interval of time. In an embodiment, notification counter 308 may compare the number of notifications relating to cloud service resource aspects transmitted to a recipient within the predetermined interval of time to a predetermined threshold number of such notifications.

In step 908, if notification counter 308 determined that the threshold number of notifications had not been reached, flowchart 900 proceeds to step 910. In response to determining that the threshold number of notifications has been reached, flowchart 900 proceeds to step 912.

In step 910, the notification is sent to the recipient. Operation of flowchart 900 ends. In an embodiment, notification monitor 302 enables the notification to be transmitted to the recipient in output messages 338.

In step 912, the recipient is placed in a throttled mode for notifications related to the aspect of the cloud service for which the threshold has been reached whereby the transmitting of future notifications to the recipient is limited. In an embodiment, notification throttler 320 may be instructed by notification monitor 302 to place the recipient in the throttled mode based on the determination made by notification counter 308.

In step 914, the recipient is informed of a web-based user interface where notifications relating to the cloud service resource, not sent due to the limiting of notifications, can be accessed. In an embodiment, updater 328 may transmit a message to the recipient to inform the recipient of being placed in the throttle mode. Updater 328 may indicate in the transmitted message (or subsequent message) a location (e.g., providing a web link in the message) where to access subsequent notifications relating to the cloud service resource. Operation of flowchart 900 ends.

Example Computer System Implementations

Computing device(s) 102, monitoring system(s) 104, resource sets 110 and 112, servers 114, 116, 118, and 120, network switch 130, network switch 132, rules manager 108, notification monitor 106, notification throttling system 300, notification monitor 302, notification classifier 304, notification log 306, notification counter 308, correlator 310, de-duplicator 312, cumulative notification generator 314, rules manager 316, user interface manager 318, notification throttler 320, email throttler 322, phone throttler 324, text/SMS throttler 326, updater 328, machine learning engine 330, heuristics engine 332, data storage 334, flowchart 200, flowchart 400, flowchart 500, flowchart 600, flowchart 700, flowchart 800, and/or flowchart 900 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
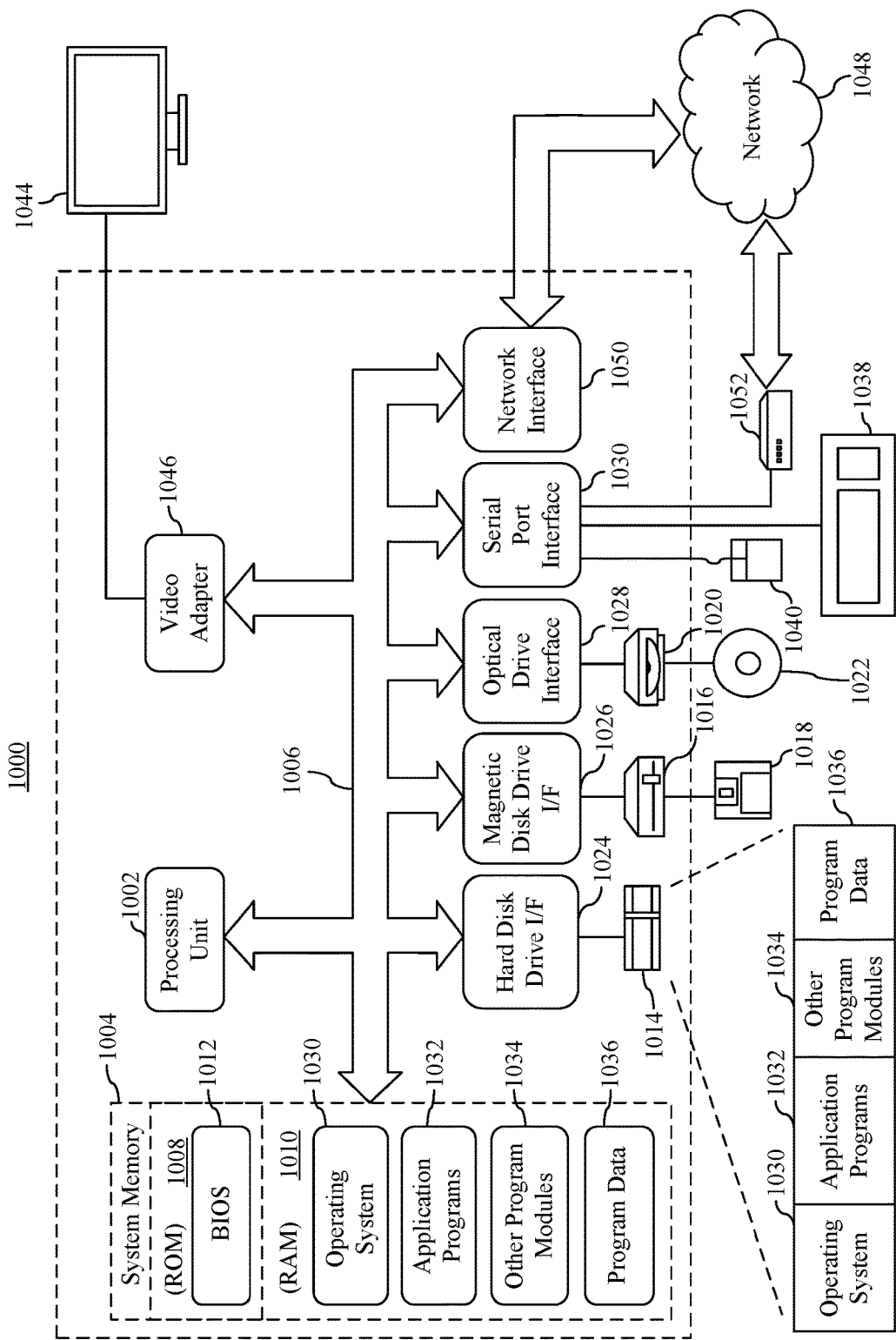
FIG. 10 is a block diagram of an example processor-based computer system that may be used to implement various embodiment.

FIG. 10 depicts an exemplary implementation of a computing device 1000 in which embodiments may be implemented. For example, system 1000 may be used to implement computing device(s) 102, monitoring system(s) 104, resource sets 110 and 112, and/or servers 114, 116, 118, and 120, as described above in reference to FIG. 1. System 1000 may also be used to implement any of the steps of any of the flowcharts of FIGS. 2 and 4-9, as described above. The description of system 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g. solid state drives (SSDs)), digital video disks, RAMs, ROMs, and other hardware storage media.

A number of program modules or components may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all the functions and features of monitoring system(s) 104, rules manager 108, notification monitor 106, notification throttling system 300, notification monitor 302, notification classifier 304, notification log 306, notification counter 308, correlator 310, de-duplicator 312, cumulative notification generator 314, rules manager 316, user interface manager 318, notification throttler 320, email throttler 322, phone throttler 324, text/SMS throttler 326, updater 328, machine learning engine 330, heuristics engine 332, data storage 334, flowchart 200, flowchart 400, flowchart 500, flowchart 600, flowchart 700, flowchart 800, and/or flowchart 900 (including any step of flowcharts 200, 400, 500, 600, 700, 800 and/or 900).

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments described herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1002 to perform any or all of the functions and features of computing device(s) 102, monitoring system(s) 104, resource sets 110 and 112, and/or servers 114, 116, 118, and 120 as described above in reference to FIG. 1 or notification throttling system 300 of FIG. 3. The program modules may also include computer program logic that, when executed by processing unit 1002, causes processing unit 1002 to perform any of the steps of any of the flowcharts of FIGS. 2 and 4-9, as described above.

Additional Exemplary Embodiments

In an embodiment, a system includes at least one processor circuit and at least one memory that stores program code configured to be executed by the at least one processor circuit. The program code includes a rules manager configured to store definitions of multiple classes of notifications for sending to recipients, the multiple classes each having a respective throttling ruleset that enables notifications in each class to be selectively throttled. A notification monitor is configured to monitor a number of notifications of the multiple classes transmitted to a plurality of recipients over time, and in response to a predetermined threshold number of notifications of a class of the multiple classes being determined by the notification monitor to have been transmitted to a recipient during a predetermined interval of time, to place the recipient in a throttled mode for the class that reduces a subsequent number of notifications of the class transmitted to the recipient. The notification monitor is further configured to inform the recipient of being placed in the throttled mode for the class, and to provide an indication of where to access subsequent notifications in the class for the recipient.

In an embodiment, the notification monitor is further configured to monitor, with respect to a throttled time window, subsequent notifications addressed to the recipient in the class placed in the throttled mode and, in response to determining, in the throttled time window, a subsequent notification in the class addressed to the recipient, and determining a number of notifications addressed to the recipient in the class during the throttled time window is less than the predetermined threshold number of notifications, to place the recipient in a non-throttled mode for the class.

In an embodiment, the notification monitor is further configured to provide an update message to the recipient regarding subsequent notifications in the class determined to be addressed to the recipient while in the throttled mode.

In an embodiment, the notification monitor is configured to automatically group a plurality of related notifications for the recipient into a cumulative notification, and to enable the cumulative notification to be provided to the recipient.

In an embodiment, a link is provided to the recipient in the cumulative notification as the indication of where to access subsequent notifications in the class. The link is configured to direct the recipient to a user interface through which the recipient can access the subsequent notifications in the class.

In an embodiment, at least a portion of the multiple classes correspond to aspects of a cloud service resource, the aspects including at least one of maintenance, outages, logs, or health.

In an embodiment, the predetermined threshold number of notifications for a class is dependent upon a delivery channel of notifications of the class.

In an embodiment, a method includes receiving a notification to be sent to a recipient. A first class of the received notification is determined, the first class included in a plurality of classes of notifications. A number of notifications in each class of the plurality of classes transmitted to the recipient is monitored and it is determined whether a threshold number of notifications for the first class of notifications has been transmitted to the recipient within a predetermined interval of time. In response to determining the threshold number of notifications in the first class is reached for the recipient during the predetermined interval of time, the recipient is placed in a throttled mode for the first class that reduces a subsequent number of notifications of the first class transmitted to the recipient. The recipient is informed of the throttled mode and provided an indication as to where a subsequent notification in the first class addressed to the recipient can be accessed.

In an embodiment, notifications in at least one class of the plurality of classes are transmitted to the recipient while the recipient is in the throttled mode for the first class.

In an embodiment, new notifications are checked for within a throttling time window while the recipient is in the throttled mode. In response to determining that no new notifications are received by the recipient within the throttling time window, the recipient is placed in a non-throttled mode with respect to the first class. In response to determining that one or more new notifications are received by the first recipient within the throttling time window, one or more further checks are performed to determine whether to send an update message to the first recipient.

In an embodiment, related notifications for the recipient are automatically grouped into a cumulative notification and the cumulative notification is transmitted to the recipient.

In an embodiment, a target address for the recipient includes at least one of a telephone number or an electronic mail address and the notifications comprise at least one of a telephone call, a text message, or an email message.

In an embodiment, at least a portion of the classes correspond to aspects of a cloud service resource, the aspects including at least one of maintenance, outage, logs, or system health.

In an embodiment, the threshold number for a particular class of notifications is dependent upon a delivery channel of the notification.

In an embodiment, a method includes determining that a new notification of a class of a plurality of classes of notifications is to be sent to a recipient. The notification is stored in a log. A notification counter for the class of notification for the recipient is increased. A number of notifications of the class transmitted to the recipient over an interval of time is compared to a threshold number. If the threshold number is reached, future notifications in the class for the recipient are automatically grouped into a cumulative notification and the cumulative notification is transmitted to the recipient.

In an embodiment, a number of notifications of a second class sent to the recipient over an interval of time is limited to a second threshold number and the recipient is informed if the second threshold number has been reached.

In an embodiment, a recipient is informed of a user interface where notifications not sent due to the limiting of the number of notifications can be accessed.

In an embodiment, if a new notification for the recipient is determined to be transmitted to the recipient within a throttling time window and, if a last notification time is more than a user update period, an update message is transmitted to the recipient.

In an embodiment, a rule for the class is applied to determine whether to transmit the notification to the first recipient.

In an embodiment, the threshold number is altered based upon a delivery channel for the notification.

In accordance with an embodiment, any combination of the above-described embodiments may be utilized depending on the system or method being implemented.

Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
   at least one processor circuit; and
   at least one memory that stores program code configured to be executed by the at least one processor circuit, the program code comprising:
   a rules manager configured to store definitions of multiple classes of notifications for sending to recipients, the multiple classes each having a respective throttling ruleset that enables notifications in each class to be selectively throttled; and
   a notification monitor configured to monitor notifications of the multiple classes transmitted to a plurality of recipients, and in response to a predetermined threshold number of notifications of a class of the multiple classes being determined by the notification monitor to have been transmitted to a recipient during a predetermined interval of time, to place the recipient in a throttled mode for the class that reduces a subsequent number of notifications of the class transmitted to the recipient;
   the notification monitor is further configured to inform the recipient of being placed in the throttled mode for the class, and to provide an indication of where to access subsequent notifications in the class for the recipient.

2. The system of claim 1, wherein the notification monitor is further configured to:
   monitor, with respect to a throttled time window, subsequent notifications addressed to the recipient in the class placed in the throttled mode; and
   in response to determining, in the throttled time window, a subsequent notification in the class addressed to the recipient, and determining a number of notifications addressed to the recipient in the class during the throttled time window is less than the predetermined threshold number of notifications, to place the recipient in a non-throttled mode for the class.

3. The system of claim 1, wherein the notification monitor is further configured to:
   provide an update message to the recipient regarding subsequent notifications in the class determined to be addressed to the recipient while in the throttled mode.

4. The system of claim 1, wherein the notification monitor is configured to automatically group a plurality of related notifications for the recipient into a cumulative notification, and to enable the cumulative notification to be provided to the recipient.

5. The system of claim 4, wherein a link is provided to the recipient in the cumulative notification as the indication of where to access subsequent notifications in the class, the link configured to direct the recipient to a user interface through which the recipient can access the subsequent notifications in the class.

6. The system of claim 1, wherein at least a portion of the multiple classes correspond to aspects of a cloud service resource, the aspects including at least one of maintenance, outages, logs, or health.

7. The system of claim 1, wherein the predetermined threshold number of notifications for a class is dependent upon a delivery channel of notifications of the class.

8. A method in a computing device comprising:
   receiving a notification to be sent to a recipient;
   determining a first class of the received notification, the first class included in a plurality of classes of notifications;
   monitoring a number of notifications in each class of the plurality of classes transmitted to the recipient;
   determining whether a threshold number of notifications for the first class of notifications has been transmitted to the recipient within a predetermined interval of time; and
   in response to determining the threshold number of notifications in the first class is reached for the recipient during the predetermined interval of time:
     placing the recipient in a throttled mode for the first class that reduces a subsequent number of notifications of the first class transmitted to the recipient,
     informing the recipient of the throttled mode, and
     providing an indication to the recipient of where to access a subsequent notification in the first class addressed to the recipient.

9. The method of claim 8 further comprising:
   transmitting notifications in at least one class of the plurality of classes to the recipient while the recipient is in the throttled mode for the first class.

10. The method of claim 8, further comprising:
    checking for new notifications within a throttling time window while the recipient is in the throttled mode;
    in response to determining that no new notifications are received by the recipient within the throttling time window, placing the recipient in a non-throttled mode with respect to the first class; and
    in response to determining that one or more new notifications are received by the first recipient within the throttling time window, performing one or more further checks to determine whether to send an update message to the first recipient.

11. The method of claim 8, further comprising:
    automatically grouping related notifications for the recipient into a cumulative notification; and
    transmitting the cumulative notification to the recipient.

12. The method of claim 8, wherein a target address for the recipient includes at least one of a telephone number or an electronic mail address; and
    wherein the notifications comprise at least one of a telephone call, a text message, or an email message.

13. The method of claim 8, wherein at least a portion of the classes correspond to aspects of a cloud service resource, the aspects including at least one of maintenance, outage, logs, or system health.

14. The method of claim 8, wherein the threshold number for a particular class of notifications is dependent upon a delivery channel of the notification.

15. A method in a computing device, comprising:
   determining that a new notification of a class of a plurality of classes of notifications is to be sent to a recipient;
   storing the notification in a log;
   increasing a notification counter for the class of notification for the recipient;
   comparing a number of notifications of the class transmitted to the recipient over an interval of time to a threshold number; and
   if the threshold number is reached, automatically grouping future notifications in the class for the recipient into a cumulative notification and transmitting the cumulative notification to the recipient.

16. The method of claim 15 comprising limiting a number of notifications of a second class sent to the recipient over an interval of time to a second threshold number and informing the recipient if the second threshold number has been reached.

17. The method of claim 16 comprising informing the recipient of a user interface where notifications not sent due to the limiting of the number of notifications can be accessed.

18. The method of claim 16 comprising determining if a new notification for the recipient is to be transmitted to the recipient within a throttling time window and if a last notification time is more than a user update period, transmitting an update message to the recipient.

19. The method of claim 15 comprising applying a rule for the class to determine whether to transmit the notification to the first recipient.

20. The method of claim 15 comprising altering the threshold number based upon a delivery channel for the notification.

* * * * *